April 1, 1958  P. G. KORT  2,829,186
PRIMARY ALKALINE CELL
Filed Aug. 24, 1956
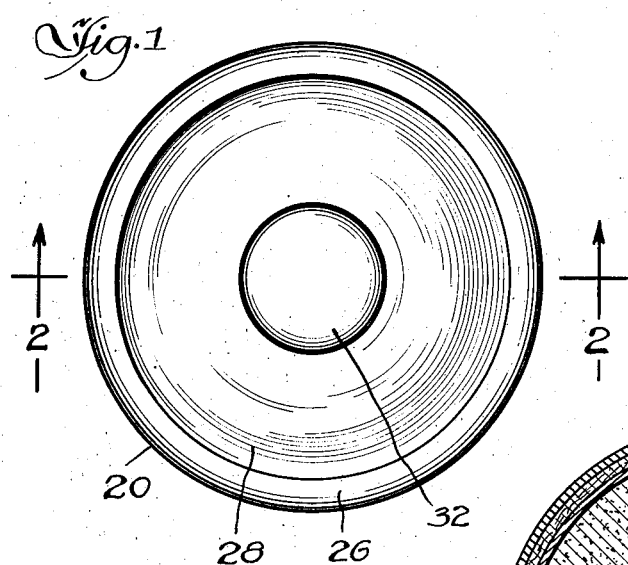
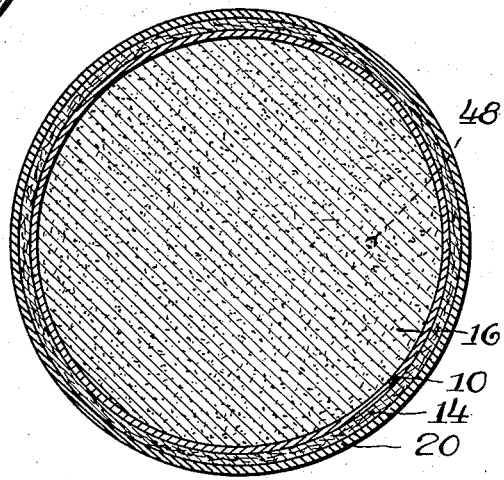
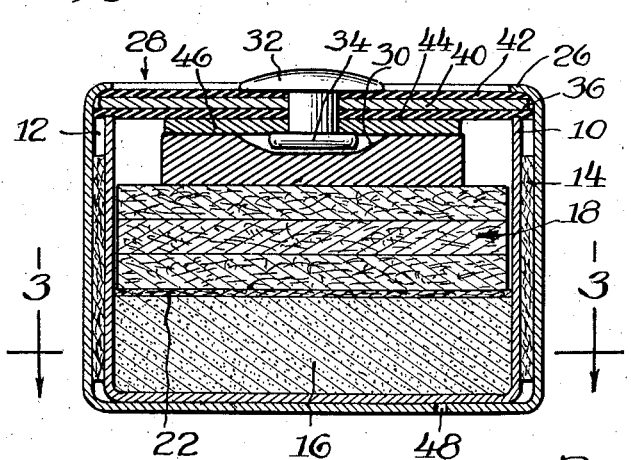
Inventor,
Paul G. Kort,
By: Jones, Tesch & Darbo,
Attys.

2,829,186
Patented Apr. 1, 1958

2,829,186

PRIMARY ALKALINE CELL

Paul G. Kort, Freeport, Ill., assignor to Burgess Battery Company, Freeport, Ill., a corporation of Delaware Application August 24, 1956, Serial No. 606,158

10 Claims. (Cl. 136—83)

This invention relates to primary cells and is particularly concerned with structure for current-producing dry cells having an alkaline electrolyte.

In dry cells of the type mentioned, gas is generated in the cell while it stands on open circuit, and unless such gas is vented in a proper and efficient manner, pressure is built up within the cell until rupture of the enclosure occurs or the seal of the cell is forced open and the gas escapes and carries with it some of the liquid cell electrolyte. If such electrolyte leaks out, it has a deleterious effect upon any object with which it comes into contact.

Accordingly, it is one object of the present invention to provide a dry cell of the type described which has a structure that serves to vent the gases to the surrounding space but prevents leakage of liquid electrolyte to the exterior of the cell. It is a further object of the invention to provide a dry cell of the type described having a simplified means to vent the gases evolved therein and which lends itself readily to mass production.

Other objects of the invention will become readily apparent from a reading of the following description, in connection with the accompanying drawing in which:

Fig. 1 is a top view of an embodiment of a dry cell constructed in accordance with the invention, Fig. 2 is a cross-sectional view of said embodiment taken along line 2—2 of Fig. 1, and Fig. 3 is a cross-sectional view taken along line 3—3 of Fig. 2.

In the dry cell of the embodiment illustrated in the drawing, two open-top cups 10 and 20 are arranged in nested fashion to form the enclosure for the cell. The cups are both made of a suitable rigid material such as steel or nickel-plated steel. The inner cup 10 is slightly shorter in height than the outer cup 20, and has its open top oriented in the same direction as the outer cup 20. An annular space 12 is formed between the two cups. Arranged within this annular space 12 is a layer of absorbent material 14, which may for example be absorbent paper such as blotting paper. Arranged in stacked relationship within the interior of the inner cup 10 are the active elements of the cell, including the anode and cathode. The depolarizing cathode 16 is composed of a mixture of powdered oxygen-yielding substance, such as mercuric oxide, mercurous oxide, silver oxide, silver peroxide, cupric oxide, cuprous oxide, or other readily-reducible oxygen-yielding compound, or mixtures of such compounds, and a suitable conductive substance such as micronized graphite. The depolarizer composition is compressed into the cup 10, the amount of composition being sufficient to fill cup 10 approximately one-third of its depth. Arranged above the depolarizing cathode 16 is a body 18 of electrolyte-receptive material, which is spaced from the cathode by a relatively thin barrier disc 22. The barrier disc is formed of a suitable liquid and ion-permeable material, resistant to the action of the electrolyte, such as parchment paper, vinyl resin, vinylidene resin, or the like.

The electrolyte-receptive body 18 is composed of a suitable porous, absorbent, electrolyte-resistant material, such as wood fibers, cotton fibers, or the like, examples of which are porous absorbent paper and cotton. The body 18 is of cylindrical shape and has a diameter smaller than the internal diameter of inner cup 10, whereby an annular space is provided between the cup 10 and the body 18. The body 18 is under compression between the anode 24 and the barrier disk 22, and is sufficiently porous to be highly absorbent of the liquid electrolyte in the cell.

Placed upon the body 18 is the negative electrode or anode 24 of the cell. This anode is composed of amalgamated zinc and is preferably in the form of a body of compressed amalgamated zinc particles. The compressed zinc body or electrode 24 has a central dished portion 30. The negative terminal 32 of the cell may be of a rivet-type construction, as shown in Figure 2, passing through the lid 28 to make electrical contact with the anode 24, the inner head 34 of the rivet being accommodated within the dished portion 30.

If desired, the exterior surface of the outer cup 20 may be nickel-plated. The top portion of the outer cup 20 is turned inwardly to form the retaining flange 26. This flange 26 overlies the peripheral portion of the lid 28 of the cell. The flange, arranged in this manner, serves to yieldably detain the lid 28 against the top edge 36 of the inner cup. The lid 28 of the cell may be made of a fairly stiff yet slightly resilient material such as neoprene, polyethylene, modified polystyrene, vinyl plastic, or vulcanized fiber. As shown in Fig. 2, the lid may alternatively, and preferably, be of a laminated construction. Thus, the lid may consist of a stiff core 40 of steel, plastic, fiber board, etc., which is bonded between two layers of resilient material 42 and 44.

With this type of construction, no separate venting gasket is required since the lid is held tightly against the inner can, containing the active cell materials, by the flange 26 of the outer can. However when gas is formed within the cell and attains sufficient pressure, the lid is forced up against flange 26 with sufficient force to partially relieve the pressure of the lid upon the edge 36 of the inner cup. The gas can therefore escape over the edge 36 of the inner cup 10 and into the annular space 12 between the two cups. Any electrolyte which may be carried along with the escaping gas is absorbed by the paper band 14 located in the annular space.

Advantageously, the lid is constructed as a laminated subassembly held together by rivet 32. As such, it is a stiff disk having resilient surface coatings capable of forming gas-tight and liquid-tight seals at the top edges of the inner and outer cups of the cell. If a metal or other electrically conductive core element 40 is used, care must be taken to provide clearance between the periphery of this element and outer cup 20 and/or between the stem of rivet 32 and the core element to prevent electric contact and consequent short-circuiting of the cell. Although direct contact may be made between rivet terminal 32 with anode 24 at inner head 34 by suitably forming and dimensioning the anode body, it is preferable to provide a conductor plate in the form of a washer 46 lying under the central area of the lid and held in the lid assembly by rivet 32. The recess 30 in anode 24 provides accommodation for head 34 of the rivet and electrical contact is made between the top surface of the anode surrounding recess 30 and conductor washer 46. Good electrical contact between washer 46 and the rivet terminal is assured by the pressure engagement of head 34 of the rivet and the surface of the washer.

Thus, the lid assembly is a multi-function element which provides for closing and sealing the cell, permits venting of gases from the inner cup when pressure therein reaches a predetermined level, and provides a negative terminal with electrical connection with the anode of the cell. The resilient surfaces of the lid provide, very simply, for the effective gasketing of the joints between lid and the respective cup top openings and between washer and rivet head and the lid. Increasing pressure within the inner cell cup tends to increase the sealing pressure between the lid and the inturned edge of the open top of the outer cup, assuring a tight joint for all conditions of internal pressure. The washer adds stiffness to the lid to further contribute to the certainty of this seal and assure desirable pressure contacts between the several elements of the cell.

A vent opening 48 is provided in the bottom of the outer cup 20 in order to allow gas escaping into the annular space 12 to be vented to the atmosphere. The opening 48, although shown as being of appreciable size in Figure 2, will actually in practice be no larger than a pin hole.

Invention is claimed as follows:

1. A primary cell comprising a pair of similarly oriented open-top metal cups nested one within the other, the side walls of said cups being spaced apart to form an annular space therebetween, active cell elements comprising an anode, a cathode and a separator containing cell electrolyte contained entirely within the inner one of said cups, a laminated sealing lid covering and closing the top of said inner cup and held in pressure contact therewith, said lid comprising a rigid inner disc having a layer of a resilient material covering each surface thereof, negative terminal means centrally positioned and sealed in said lid and passing therethrough, the inner extremity of said terminal means being maintained in pressure contact with said anode and the outer extremity being externally exposed providing a negative contact, the rim of said outer cup being flanged over the edge of said laminated sealing lid and applying axial sealing force thereto, whereby a permanently sealed joint is formed between the sealing lid and the outer can and a resiliently sealed joint permitting the escape of gas under pressure from the interior of the inner cup to said annular space is formed between the sealing lid and the inner cup.

2. A primary cell according to claim 1 having a liquid-absorbent body in the annular space between the cups.

3. A primary cell according to claim 1 having a means for venting gas from said annular space to the atmosphere.

4. A primary cell according to claim 1 having a metallic rivet at the center of the lid and extending therethrough to form an exposed cell terminal.

5. A primary cell according to claim 1 having a metallic washer engaging the exposed surface of the inner resilient layer of said sealing lid and a metallic rivet at the center of said lid holding the elements of said lid together, and having an exposed head forming a cell terminal.

6. A primary cell according to claim 1 wherein said negative terminal means comprises a metallic washer underlying the sealing lid and a rivet holding the lid assembly and washer together, and having a head exposed at the top of said lid, said washer electrically connecting the cell anode with said rivet.

7. A lid assembly adapted to form a seal closure for a double-walled primary cell comprising a stiff disk, a layer of resilient non-conductive material covering both faces of said disk, and an electrically conductive element extending through said layers and disk and exposed on both sides of said lid assembly for electrical connection from one side of said lid assembly to the other.

8. A lid assembly in accordance with claim 7 wherein the layers of resilient material are bonded to the disk.

9. A lid assembly in accordance with claim 7 wherein said electrically conductive element is a metallic rivet having the heads thereof exposed on the opposite sides of the lid assembly.

10. A lid assembly adapted to form a seal closure for a double-walled primary cell comprising a stiff disk, a layer of resilient non-conductive material covering both faces of said disk, a metallic washer engaging the exposed surfaces of one of said layers of resilient material, and a metallic rivet extending through said disk, layers and washer at the center thereof holding the lid assembly together and having exposed heads to form electrical contact terminal means.

References Cited in the file of this patent

UNITED STATES PATENTS

| | | |
|---|---|---|
| 2,060,796 | Cahoon | Nov. 17, 1936 |
| 2,490,598 | Oliver | Dec. 6, 1949 |
| 2,608,595 | Conklin | Aug. 26, 1952 |
| 2,636,062 | Colton | Apr. 21, 1953 |